Patented Dec. 28, 1926.

1,611,941

UNITED STATES PATENT OFFICE.

JOHN L. OSBORNE, OF ELIZABETH, NEW JERSEY, AND GEORGE BARSKY, OF NEW YORK, N. Y., ASSIGNORS TO AMERICAN CYANAMID COMPANY, OF NEW YORK, N. Y., A CORPORATION OF MAINE.

METHOD OF PREPARING SUBSTITUTED CYANAMIDES.

No Drawing.    Application filed June 29, 1925.    Serial No. 40,422.

This invention relates to the production of derivatives of cyanamide, more particularly to aromatic substitution products thereof.

It has previously been proposed to make phenylcyanamide by first producing monophenylthiourea and then desulphurizing the same by means of lead oxide in aqueous or alcoholic alkali solution. The product, which remained dissolved in the alkali, was precipitated by means of acetic acid. In an analogous manner phenylhydroxylthiourea was prepared by the reaction between hydroxylamine and phenyl-mustard oil, and the product dissolved in a small quantity of alcohol, which was then quickly heated to the boiling point, forming a solution of phenylcyanamide and precipitating sulphur, which was filtered off. Another proposed method was to cause cyanogen chloride and aniline to react in dry, ethereal solution and evaporate the same to give a residue of phenylcyanamide.

The proposed methods were satisfactory for laboratory work where it was unnecessary to produce the materials cheaply. But for commercial operation, where economy and efficiency are essential, these methods were not feasible because of the high cost of the ingredients used, the low efficiencies of conversion and the necessary treatment of the reaction product to purify and recover the same. Some of the prior methods involved steps which were complicated and could not be carried out by the ordinary workman.

It is among the objects of this invention to avoid the disadvantages of the prior laboratory methods and to provide a process for the production of aromatic cyanamide compounds which shall be simple, highly efficient, adapted to operate on a large scale, and which shall not require the services of highly skilled, technical men for the successful operation thereof.

In practicing this invention, there is provided a solution of an aromatic amine in water and gaseous cyanogen chloride is passed into the same to react with the amine to produce the corresponding aromatic cyanamide. It is highly desirable to keep the reaction mixture cool because if allowed to heat up due to the heat of reaction, the product obtained is an oil which solidifies on cooling, but which polymerizes in a short time. It was found that tap water at 20° to 25° C. for cooling, was sufficiently cold to give a crystalline product, but it was of a little darker color than the product made similarly by cooling with ice water at 15° to 20° C. The cyanogen chloride used should be free from chlorine, because if chlorine is present in the gas an oily black substance, which makes further purification necessary, is obtained. In the reaction there is liberated hydrochloric acid which reacts with the aromatic amine and neutralizes the same, unless some substance is present to combine with the hydrochloric acid. Precipitated calcium carbonate was found to react in a satisfactory manner with the hydrochloride of the amine used, liberating the amine and carbon dioxide and forming calcium chloride, which dissolved in the reaction mixture. This substance was used in preference to caustic soda or sodium carbonate because it was found that calcium carbonate was so weakly alkaline that it did not react with the cyanogen chloride.

When aniline is used to form phenylcyanamide, there is provided a saturated solution thereof in water in contact with an excess of aniline oil. Cyanogen chloride gas is passed through a scrubber or tower containing copper or iron, which combines with and removes any chlorine therein, after which it is bubbled through or passed over the aniline solution combining therewith. An amount of calcium carbonate sufficient to react with the hydrochloric acid formed is added to the reaction mixture before passing in the cyanogen chloride. The reaction product is removed from the mother liquor by filtration and washing with water but an excess of washing should be avoided since the phenylcyanamide is soluble to the extent of about 0.5 grams per 100 cc. at 20° C. If further purification is desired the precipitated product is dissolved in an alkali solution, clarified by filtration through finely divided charcoal if necessary, and re-precipitated with hydrochloric or acetic acid. The wet, bulky mass, which contains a considerable amount of water which cannot be readily removed by wringing, is heated to 40° to 45° C. to melt the same, causing a separation into an aqueous and an oily layer, the latter being removed and allowed to cool and solidify as the hemi-hydrate of phenylcyanamide.

A detailed example of the operation of the process is as follows:

Into an enameled pot, which was set in a vat adapted for the circulation of cooling water, was placed about 13.4 liters of water, 910 grams of calcium carbonate and some aniline. During the course of the ensuing reaction aniline was added from time to time so that an excess thereof was always present, the total amount of aniline used being 1693 grams. 1125 grams of liquid cyanogen chloride were vaporized and passed through an iron scrubber and then into the aniline solution, which was maintained at 15° to 20° C. by the circulation of cooling water, and which was stirred to aid the reaction. At the end of the reaction a little hydrochloric acid was added to dissolve any excess of calcium carbonate that might be present, and the reaction product was filtered, dried and weighed. The yield, calculated as anhydrous phenylcyanamide, was 1.82 kilograms or 84.8% of the theoretical yield based on the aniline used. In addition, there was lost in the liquors about .09 kilograms, indicating a total conversion of about 89% of the theoretical. Most of the remaining 11% loss may be accounted for by the presence of impurities in the reacting ingredients.

The product was dissolved in caustic soda solution, treated with finely divided charcoal and filtered, after which it was reprecipitated with hydrochloric acid, filtered and washed with water. The yield of material recovered was 93%, with a loss in the solution of 3.6% and a mechanical loss (by difference) of 3.4%. The final product consisted of snow-white crystals which analyzed 75.5% anhydrous phenylcyanamide, the remainder being water. Upon melting the product at 40° to 45° C. and recovering the oily layer, the recovery was practically quantitative and the product analyzed 97% of the hemi-hydrate or 90% of the anhydrous phenylcyanamide.

The same method was followed in the preparation of orthotolylcyanamide, except that orthotoluidine was substituted for the aniline. About 750 grams of orthotoluidine were gradually added to 5 liters of water, containing 350 grams of calcium carbonate, while stirring rapidly and passing in 430 grams of cyanogen chloride gas. The reaction product was a mixture of flakes and globules of solid orthotolylcyanamide. The yield was 79.4% of the theoretical, based on the orthotoluidine used. The melting point of the product is considerably higher than that of phenylcyanamide and it does not liquefy on standing in a warm room.

Although there has been set forth the production of phenylcyanamide and orthotolylcyanamide, this invention is not limited thereto as the method described is adapted to the production of related compounds. The temperature of the reacting mixture need not be within the limits, 15° to 25° C. set forth above, and higher or lower temperatures, preferably lower, may be employed. The addition of hydrochloric acid at the end of the reaction is not essential and may be omitted if the amount of calcium carbonate used is such that no appreciable amount thereof remains. It is not necessary to use a solution of aniline or other amine in this process, but a mixture thereof with water, in which the amine is present in excess of its solubility in water may be used. These and other changes may be made in the above described invention, the scope of which is defined in the claims appended hereto.

What is claimed is:

1. A method of preparing aromatic substituted cyanamides which comprises providing an aqueous solution of an aromatic amine and causing the same to react with cyanogen chloride.

2. A method of preparing aromatic substituted cyanamides which comprises providing an aqueous solution of an aromatic amine and causing the same to react with cyanogen chloride in the cold.

3. A method of preparing aromatic substituted cyanamides which comprises providing an aqueous solution of an aromatic amine and causing the same to react with cyanogen chloride at a temperature below 25° C.

4. A method of preparing aromatic substituted cyanamides which comprises providing an aqueous solution of an aromatic amine and causing the same to react with cyanogen chloride at a temperature below 25° C. and stirring the reaction mixture.

5. A method of preparing aromatic substituted cyanamides which comprises providing an aqueous solution of an aromatic amine and causing the same to react with cyanogen chloride at a temperature below 20° C.

6. A method of preparing aromatic substituted cyanamides which comprises providing an aqueous solution of an aromatic amine, adding an alkaline material thereto and causing the same to react with cyanogen chloride.

7. A method of preparing aromatic substituted cyanamides which comprises providing an aqueous solution of an aromatic amine, adding a moderately alkaline material thereto and causing the same to react with cyanogen chloride.

8. A method of preparing aromatic substituted cyanamides which comprises providing an aqueous solution of an aromatic amine, adding an alkali earth metal compound having an alkaline reaction thereto and causing the same to react with cyanogen chloride.

9. A method of preparing aromatic substituted cyanamides which comprises providing an aqueous solution of an aromatic amine, adding calcium carbonate thereto and causing the same to react with cyanogen chloride.

10. A method of preparing aromatic substituted cyanamides which comprises providing an aqueous solution of an aromatic amine, adding an alkali earth metal compound having an alkaline reaction thereto and causing the same to react with cyanogen chloride in the cold.

11. A method of preparing aromatic substituted cyanamides which comprises providing an aqueous solution of an aromatic amine, adding calcium carbonate thereto and causing the same to react with cyanogen chloride in the cold.

12. A method of preparing aromatic substituted cyanamides which comprises providing an aqueous solution of an aromatic amine and causing the same to react with chlorine-free cyanogen chloride.

13. A method of preparing aromatic substituted cyanamides which comprises providing an aqueous solution of an aromatic amine, adding an alkali earth metal compound having an alkaline reaction thereto and causing the same to react with chlorine-free cyanogen chloride.

14. A method of preparing aromatic substituted cyanamides which comprises providing an aqueous solution of an aromatic amine, adding calcium carbonate thereto and causing the same to react with chlorine-free cyanogen chloride.

15. A method of preparing aromatic substituted cyanamides which comprises providing an aqueous solution of aniline, adding an alkaline material thereto and passing cyanogen chloride therethrough.

16. A method of preparing aromatic substituted cyanamides which comprises providing an aqueous solution of aniline, adding an alkaline material thereto and passing cyanogen chloride therethrough in the cold.

17. A method of preparing aromatic substituted cyanamides which comprises providing an aqueous solution of aniline, adding calcium carbonate thereto, passing cyanogen chloride therethrough, and maintaining a temperature below 25° C. in the reacting mixture.

In testimony whereof, we have hereunto subscribed our names the 26th day of June, 1925.

JOHN L. OSBORNE.
GEORGE BARSKY.